July 18, 1961 A. D. DE SHANO 2,992,664
CUTTER BIT HOLDER

Filed July 25, 1960 2 Sheets-Sheet 1

INVENTOR.
ALPHONSE D. DESHANO
BY
J Warren Kinney Jr.
ATTORNEY

July 18, 1961     A. D. DE SHANO     2,992,664
CUTTER BIT HOLDER

Filed July 25, 1960     2 Sheets-Sheet 2

INVENTOR.
ALPHONSE D. DeSHANO
BY
J. Warren Kinney Jr.
ATTORNEY

United States Patent Office 2,992,664
Patented July 18, 1961

2,992,664
CUTTER BIT HOLDER
Alphonse D. De Shano, 950 Noyes Ave., Hamilton, Ohio
Filed July 25, 1960, Ser. No. 44,915
3 Claims. (Cl. 144—235)

This invention relates to stump cutters, and more particularly to an improvement in the cutter bit or tool holders of stump cutters.

An object of the invention is to provide cutter bit or tool holders for secure though removable attachment to the rotating cutter-carrying disk of a stump cutter, which holders are designed whereby to support hardened cutter bits in such a manner as to effectively extend their useful cutting life.

Another object of the invention is to teach a method of mounting cutter bits in tool holders onto a rotatable cutter disk for providing a cutting pattern which will materially increase the rate of operation of a conventional stump cutter although using the same number of cutter bits.

These and other objects are attained by the means described herein and as disclosed in the accompanying drawings, in which.

At the outset it should be understood that the subject invention is neither directed to nor concerned with the structural details of a stump cutting machine, since the present invention is primarily directed to the provision of unique tool holders which may be readily associated with the cutting disks or wheels of presently existing stump cutters.

Figure 2:
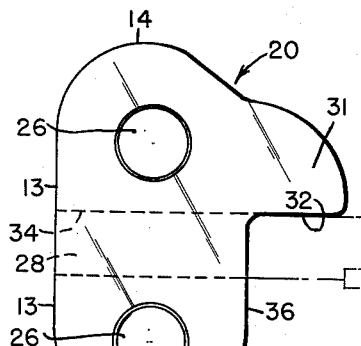
FIG. 2 is a view of the left side of the tool holder of FIG. 1.
Figure 3:
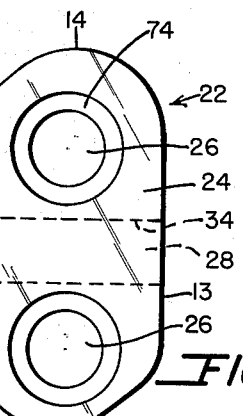
FIG. 3 is a view of the right side of the tool holder of FIG. 1.
Figure 1:
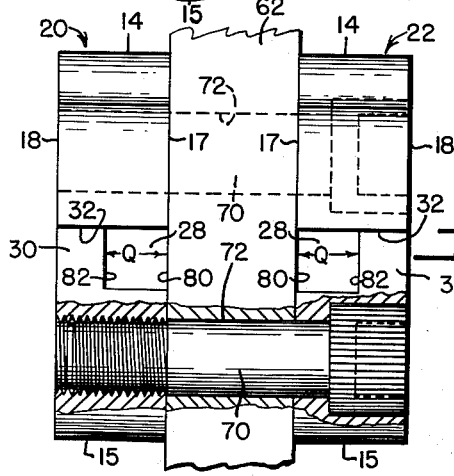
FIG. 1 is a front fragmentary view, partly in section, of a cutter disk provided with a pair of tool holders embodying the teachings of the present invention.
Figure 6:
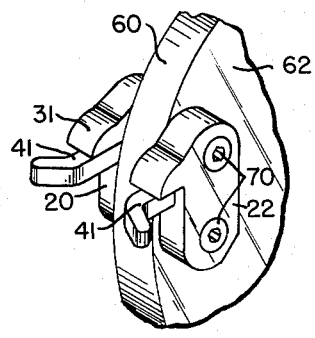
FIG. 6 is a fragmentary view of a pair of tool holders each mounting a cutter to a cutter wheel.
Figures 7, 8, 9:
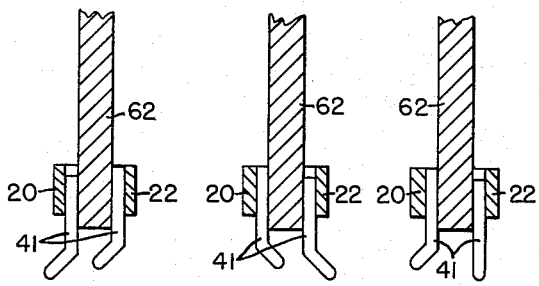
FIG. 7 is a view, partly in cross-section, illustrating the relationship of the cutters at stations A of FIG. 4.
FIG. 8 is a view similar to FIG. 7, illustrating the cutters at stations B of FIG. 4.
FIGS. 9, 10, 11 and 12 are similar to FIGS. 7 and 8, illustrating the relationship of the cutter bits at stations C, D, E and F, respectively, of FIG. 4.
Figures 10, 11, 12:
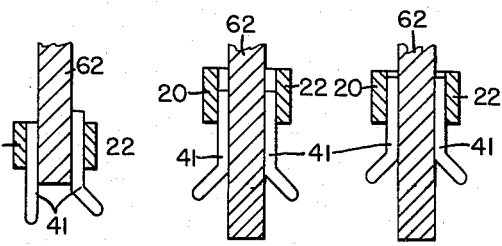

With particular reference now to FIGS. 1, 2 and 3, the numerals 20 and 22 denote a pair of complementary tool holders, each of which is fabricated from a relatively thick piece of metal formed whereby to provide an elongate body portion 24 having front, rear, upper, lower and opposed side faces 36, 13, 14, 15, 17 and 18. A pair of bores 26 are provided through said body on the longitudinal axis thereof. A tool-shank receptive slot 28, as best illustrated in FIGS. 1 and 6, is provided in the side face 17 of the tool holders midway between bores 26 and on an axis normal to the longitudinal axis of said body. The depth of slot 28 is somewhat greater than one-half the overall thickness between side faces 17 and 18, whereby to provide a rugged, rigid rear wall 30.

Each of the tool holders includes an integral, forwardly extending abutment 31 having a lower axial face 32 in alignment with the upper edge 34 of slot 28.

Figure 4:
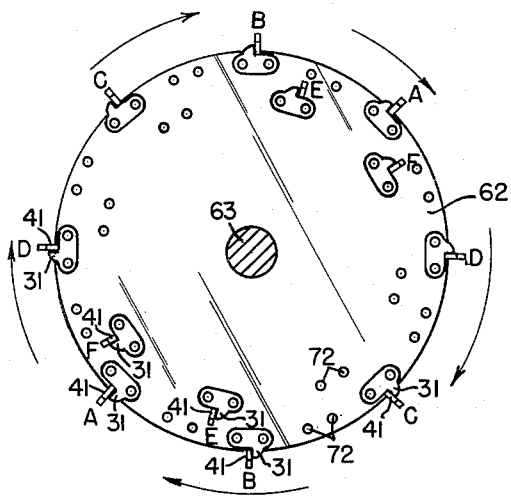
FIG. 4 is a side view of a typical cutter disk provided with tool holders and cutters according to the teachings of the present invention.
Figure 5:
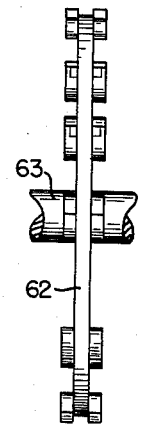
FIG. 5 is an edge view of FIG. 4.

As best illustrated in FIGS. 2 and 3, overhanging portion 31 projects forwardly from the front wall 36 of the body portion by a dimension which approximates one-half the length of slot 28 between front and rear faces 36 and 13, whereby to provide a substantial, rugged bearing surface for shank 40 of a cutter bit 41 received within slot 28. It is the universal practice to provide cutter bits 41 with carbide tips 42. As best illustrated in FIGS. 4 and 6, over-hanging portions 31 of the tool holders are adapted to extend outwardly beyond the outer periphery 60 of the cutter disk or wheel 62 whereby to overlie and substantially reinforce the cutter bits associated therewith. The numeral 63 denotes generally a rotatable shaft to which disk 62 is secured in driven relationship.

In use, a pair of matched tool holders are adapted to be mounted on opposite sides of the cutter disk or wheel 62 by means of bolts 70 which extend through bores 26 of the tool holders and through axial bores 72 of the cutter disk or wheel 62. One tool holder of each pair is provided with a socket 74 for the reception of the headed portion of bolt 70, the opposite threaded end of the bolt being adapted to threadably engage internally threaded bore 26 of the other tool holder. The width dimension Q (FIG. 1) of each slot is slightly less than the corresponding width of a cutter bit receivable within slot 28 whereby tightening up on bolts 70 will securely anchor the tool bits in place by reason of the opposite faces thereof being clamped between adjacent surfaces 80 and 82 of the cutter disk or wheel 62 and slots 28.

With reference now to FIG. 4 and FIGS. 7 through 12, it will be noted that I provide different arrangements of the cutter bits for the various stations A through F. The disclosed arrangement has been found to provide cutting qualities that are far superior to those obtainable using conventionally mounted cutter bits. With reference to FIG. 4, it will be noted that I utilize but 12 pairs of cutters, instead of 24 single cutters, as indicated by the pairs of unused holes 72 through cutter disk or wheel 62.

Figure 13:
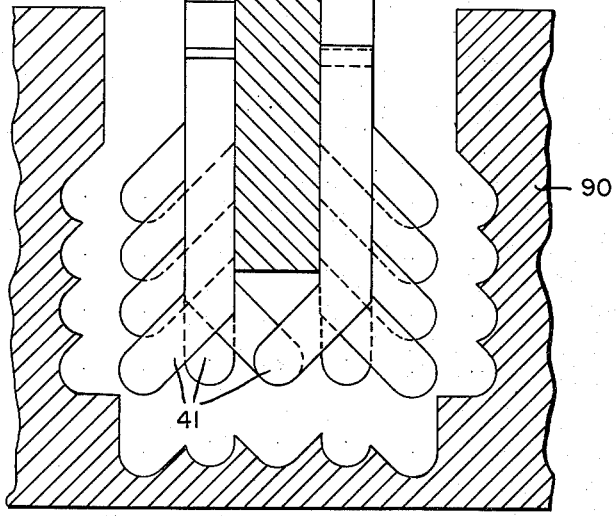
FIG. 13 is a composite diagrammatic view of the cut pattern obtainable from the cutter disk of FIG. 4.

It has been found that when said bits are mounted as illustrated for stations A through F, inclusive, the operator is able to obtain a cut pattern as illustrated in FIG. 13 incident to movement of the cutter disk or wheel 62 into, or to the right or left of, a stump denoted generally by the numeral 90.

The structural details of the tool holders provide support to the cutter bits in such a manner as to prolong by many times the average life of such cutter bits, particularly when the bits are provided with carbide, or other hardened tips.

With particular reference now to FIG. 4, it will be noted that I have provided four diametrically spaced pairs of cutter stations A, B, C and D adjacent the outer periphery of disk 62, and two pairs of diametrically spaced pairs of inboard cutter stations E and F.

What is claimed is:

1. A cutter bit holder comprising an elongate body portion having front, rear, top, bottom and opposed side faces, and having a pair of spaced bores on the longitudinal axis thereof extending therethrough from side to side, said holder being provided with a slot in one of said side faces midway between said bores with the axis of said slot normal to the longitudinal axis of said body, an abutment integral with and projecting forwardly beyond the front face of said body portion, said abutment having a lower face in axial alignment with the upper face of said slot.

2. A cutter bit holder comprising an elongate body portion having front, rear, top, bottom and opposite side faces, and having a pair of spaced bores on the longitudinal axis thereof extending therethrough from side to side, said holder being provided with a slot in one of said side faces midway between said bores, with the axis of said slot normal to the longitudinal axis of said body, an abutment integral with and projecting forwardly beyond the front face of said body portion above said slot, said abutment having a lower face in axial alignment with the upper face of said slot, wherein the length of the lower face of said abutment approximates one-half the overall length of said slot.

3. A cutter bit holder comprising an elongate body portion having front, rear, top, bottom and opposed side faces, and having a pair of spaced bores on the longitudinal axis thereof extending therethrough from side to side, said holder being provided with a slot in one of said side faces extending between said front and rear faces, said slot being disposed midway between said bores with the axis of said slot normal to the longitudinal axis of said body, an abutment integral with and projecting forwardly beyond the front face of said body portion, said abutment having a lower face the width of said body and in axial alignment with the upper face of said slot, wherein the length of the lower face of said abutment approximates one-half the overall length of said slot.

References Cited in the file of this patent

UNITED STATES PATENTS

| | | |
|---|---|---|
| 843,498 | Shimer | Feb. 5, 1907 |
| 2,728,366 | Woodell | Dec. 27, 1953 |
| 2,731,991 | Cowley | Jan. 24, 1956 |
| 2,922,449 | Sam | Jan. 26, 1960 |
| 2,960,129 | Osborn | Nov. 15, 1960 |